United States Patent [19]
Cook et al.

[11] Patent Number: 6,060,087
[45] Date of Patent: May 9, 2000

[54] METHOD OF INCREASING FAT FIRMNESS AND IMPROVING MEAT QUALITY IN ANIMALS

[75] Inventors: Mark E Cook, Madison, Wis.; Daria L Jerome, Detroit Lakes, Minn.; Michael W Pariza, Madison, Wis.; Dennis R Buege, Madison, Wis.; Paul Mozdziak, Madison, Wis.

[73] Assignee: Wisconsin Alumni Research Foundation, Madison, Wis.

[21] Appl. No.: 09/212,613

[22] Filed: Dec. 16, 1998

Related U.S. Application Data

[63] Continuation-in-part of application No. 08/845,535, Apr. 25, 1997, Pat. No. 5,851,572.

[51] Int. Cl.$^7$ ...................................................... A23K 1/00
[52] U.S. Cl. .................................................. 426/2; 426/807
[58] Field of Search ........................................ 426/2, 807

[56] References Cited

U.S. PATENT DOCUMENTS

| | | | |
|---|---|---|---|
| 4,603,142 | 7/1986 | Burger et al. | 514/456 |
| 4,886,001 | 12/1989 | Maruta | 426/623 |
| 5,017,614 | 5/1991 | Pariza et al. | 514/558 |
| 5,070,104 | 12/1991 | Pariza et al. | 514/549 |
| 5,162,337 | 11/1992 | Elbrecht et al. | 514/300 |
| 5,208,356 | 5/1993 | Pariza et al. | 554/79 |
| 5,428,072 | 6/1995 | Cook et al. | 514/560 |
| 5,430,066 | 7/1995 | Cook et al. | 514/558 |
| 5,554,646 | 9/1996 | Cook et al. | 514/560 |

FOREIGN PATENT DOCUMENTS

| | | |
|---|---|---|
| 61-216658 | 9/1986 | Japan . |
| 05268882 | 10/1993 | Japan . |
| 1464924 | 4/1974 | United Kingdom . |
| 94/16690 | 8/1994 | WIPO . |
| 95/22598 | 8/1995 | WIPO . |
| 96/06605 | 3/1996 | WIPO . |

OTHER PUBLICATIONS

Hartfiel, Fett Wissenschaff Technologie, vol. 96(2) p. 50–55, 1994.
Smith et al., Int. Dairy Congv. Proc. vol. 1, p. 199–204, 1966.
Arnold et al., "Effect of Long–or Short–Term Feeding of αTocopheryl Acetate to Holstein and Crossbred Beef Steers on Performance Carcass Characteristics, and Beef Color Stability," *J. Anim. Sci.* 70:355–365 (1992).
Faustman et al., "Improvement of Pigment and Lipid Stability in Holstein Steer Beef by Dietary Supplementation with Vitamin E," *Journal of Food Science* 54:858–862 (1989).
Buege, Dennis, "Vitamin E. Feeding and Retail Color Stability in Beef," *IFT Newsletter of Muscle Foods Div. of Inst. of Food Technology*, 19:2 (1993).
Faustman, L.C., "Postmortem Changes in Muscle Foods," *Muscle Foods: Meat, Poultry and Seafood Technology*, at 75–76 (Kinsman et al., ed., 1994).
Forrest et al., "Chemical Affecting Deteriorative Changes", *Principals of Meat Science*, 1st Ed. (1975).
Ha et al., *Carcinogenesis*, 8:12:1881–87 (1987).
Ha et al., *J. Agric. Food Chem.*, 37:1:75–81 1987.
Hedrick et al., "Chemical Reactions Affecting Deteriorative Changes," *Principles of Meat Science*, 3rd Ed., at 184 (1994).
Jeremiah , L.E., "Marbling and Pork Tenderness," *National Pork Producers Council Fact Sheet* (1998).
Pariza, M.W., Food Research Institute 1988 Annual Fall Meeting, Oct. 12, 1999.
The Merck Index, Tenth Edition, (1983), at 790.
The Merck Veterinary Manual, Fifth Edition (1979), pp. 1340–43, 1374, 1379.

*Primary Examiner*—Chhaya D. Sayala
*Attorney, Agent, or Firm*—Quarles & Brady LLP

[57] ABSTRACT

A method of treating meat animals to increase fat firmness, shelf life and meat quality indices consisting of administering to the meat animals a safe and effective amount of conjugated linoleic acid or CLA.

32 Claims, No Drawings

METHOD OF INCREASING FAT FIRMNESS AND IMPROVING MEAT QUALITY IN ANIMALS

CROSS REFERENCE TO RELATED APPLICATION

This application is a continuation-in-part of allowed U.S. application Ser. No. 08/845,535, filed Apr. 25, 1997, incorporated herein by reference in its entirety, which issued on Dec. 22, 1998 as U.S. Pat. No. 5,851,572.

STATEMENT REGARDING FEDERALLY SPONSORED RESEARCH OR DEVELOPMENT

Not applicable.

BACKGROUND OF THE INVENTION

The present application generally relates to methods of treating animals. More particularly, it relates to a method of treating animals to improve meat quality and lengthen shelf life.

As the American population increasingly uses unsaturated fats in food preparation, the resulting spent restaurant greases are increasingly unsaturated. These greases/oils are in turn used by the animal feed industries to feed meat animals, such as pigs. Because of the high degree of unsaturation of these oils, animals eating these oils have softer fat and tissue. In addition, corn is being genetically selected for higher levels of unsaturated fats. Since corn is a major component of animals diets, the use of high oil corn in place of saturated fat also soften fats and tissues. This creates a major problem in slicing meats (e.g. bacon). The soft fat disrupts slicing operations by producing unacceptable slices and clogging the blade, resulting in lost time and reduced value product.

The only method previously known to assure a firm fat was to feed animals fatty acids or oils high in saturated fats. Due to current trends in human nutrition, such fats are less available for animal feeding. Also, the use of high oil corn varieties decreases the level of added animal fat in diets.

Animal diets high in unsaturated fatty acids also increase the susceptibility of meats processed from those animals to oxidation and oxidative rancidity. This results in the development of strong, undesirable odors and flavors in the meat, followed by its subsequent removal from the shelves of local markets. Oxidative rancidity occurs when meat fats are exposed to molecular oxygen in air. This may be further enhanced by pro-oxidants, such as sodium chloride, heat, low pH, ultraviolet light and numerous other substances or agents.

Polyunsaturated fatty acids are especially susceptible to oxidation because of their high number of reactive double bonds. Saturated fatty acids, on the other hand, contain no double bonds and are less susceptible to oxidation and oxidative rancidity. It would be desirable to produce animal products, especially processed meats, that are less susceptible to oxidative rancidity and that have a longer shelf life than existing meat products.

BRIEF SUMMARY OF THE INVENTION

The present invention is summarized in that feeding meat animals a conjugated linoleic acid, an unsaturated fatty acid, surprisingly counteracts adverse effects of the increased unsaturated fatty acid in the diet of the meat animals and results in meat having improved quality and longer shelf life including a firmer fat.

In the method of the present invention a conjugated linoleic acid, a non-toxic salt of a conjugated linoleic acid, an active ester of a conjugated linoleic acid, an active isomer of a conjugated linoleic acid, an active metabolite of a conjugated linoleic acid, or a mixture thereof, is administered to an animal intended for meat production in an amount effective to improve meat quality and to increase fat firmness. The conjugated linoleic acids, their non-toxic salts, active esters, active isomers, active metabolites, and mixtures thereof are collectively referred to herein as "conjugated linoleic acid" or "CLA".

The increased fat firmness of the fat allows for improved processing characteristics, such as slicing of pork bellies into bacon. The method of the present invention also allows the feed industry to feed a higher concentration of unsaturated fatty acid (i.e. vegetable oil) to meat animals without causing undesirable soft tissue and soft fat meat products.

The meat obtained from a CLA-fed animal also surprisingly exhibits longer flavor shelf life than meat from non-CLA-fed control animals. The longer shelf life correlates with a decrease in the percentage of unsaturated fat and an increase in the percentage of saturated fatty acid. Although CLA has previously been shown to be an antioxidant when added to food products, the inventors believe that it is novel to reduce fat oxidation by feeding a fatty acid that can reduce the amount of fatty acids susceptible to oxidation.

Buege, D., "Vitamin E Feeding and Retail Color Stability in Beef," Newsletter of Muscle Foods Division of Institute of Food Technology, v. 19, No. 2, Winter 1993, shows reduced discoloration in meat from cattle fed vitamin E for a period of time prior to slaughter. Arnold, R. N. et al., J. Anim. Sci. 70:3055 (1992) showed an effect of atocopheryl acetate on beef color stability. Faustman, C. et al., J. Food Sci. 54:858 (1989) showed improved lipid stability in Holstein steer beef from cattle fed vitamin E.

It is an object of the present invention to disclose a method of increasing fat firmness, quality and shelf life of meat.

It will be apparent to those skilled in the art that the aforementioned objects and other advantages may be achieved by the practice of the present invention.

BRIEF DESCRIPTION OF THE SEVERAL VIEWS OF THE DRAWINGS

Not applicable.

DETAILED DESCRIPTION OF THE INVENTION

The method of the present invention may take several embodiments. In a preferred embodiment, the CLA is orally administered to the animal in a amount which is safe and effective to improve meat quality and to increase the firmness of the fat in the animal which also improves the quality of meat obtained from the animal while extending the meat's flavor or organolytic shelf life. Because of the differences in ages, size and nature of animals, the amounts which are safe and effective may vary considerably. Since CLA is a natural food ingredient and it is relatively non-toxic, the amounts which can be administered in the methods of the invention are not critical as long as they are enough to be effective.

In one embodiment, CLA is added to an animal's diet by adding the CLA to feed. In another embodiment, the CLA can be administered to an animal in a veterinary composition containing a safe and effective dose of the CLA. In still another embodiment, the meat animal is fed a food product, such as milk, vegetable oils or egg solids, which have been enriched so that they contain high concentrations of CLA.

The feed and veterinary preparations for use in the methods of the present invention preferably are those containing the CLA in the form of a free fatty acid or triglyceride esters in combination with a conventional feed or approved veterinary diluent. Other active forms of CLA including, without limitation, the non-toxic salts and mixtures can be used.

The free conjugated linoleic acids (CLA) have been previously isolated from fried meats and described as anti-carcinogens by Y. L. Ha, N. K. Grimm and M. W. Pariza, in Carcinogenesis Vol. 8, No. 12, pp. 1881–1887 (1987). Since then, they have been found in some processed cheese products (Y. L. Ha, N. K. Grimm and M. W. Pariza, in J. Agric. Food Chem., Vol. 37, No. 1, pp. 75–81 (1987)).

The free acid forms of the CLA may be prepared by isomerizing linoleic acid. The non-toxic salts of the free CLA acids may be made by reacting the free acids with a non-toxic base. Natural CLA may also be isolated from tallow or prepared from linoleic acid by the action of $W^{12}$-cis, $W^{11}$-transisomerase from a harmless microorganism such as the Rumen bacterium *Butyrivibrio fibrisolvens*. Harmless microorganisms in the intestinal tracts of rats and other monogastric animals may also convert linoleic acid to CLA (S. F. Chin, W. Liu, K. Albright and M. W. Pariza, 1992, FASEB J.6:Abstract #2665, incorporated herein by reference).

The CLA obtained by the practice of the described methods of preparation contains one or more of the 9,11-octadecadienoic acids and/or 10,12-octadecadienoic acids and active isomers thereof. It may be free or bound chemically through ester linkages. The CLA is heat stable and can be used as is, or dried and powdered. The free acids are readily converted into non-toxic salts, such as the sodium or potassium salts, by reacting chemically equivalent amounts of the free acid with an alkali hydroxide at a pH of about 8 to 9.

Theoretically, 8 possible geometric isomers of 9,11- and 10,12-octadecadienoic acid (c9,c11; c9,t11; t9,c11; t9,t11; c10,c12; c10,t12; t10,c12 and t10,t12) would form from the isomerization of c9,c12-octadecadienoic acid. As a result of the isomerization, only four isomers (c9, c11; c9,t11; t10, c12; and c10,c12) would be expected. However, of the four isomers, c9,t11- and t10,c12-isomers are predominantly produced during the autoxidation or alkali-isomerization of c9,c12-linoleic acid due to the co-planar characteristics of 5 carbon atoms around a conjugated double-bond and spatial conflict of the resonance radical. The remaining two c,c-isomers are minor contributors.

The relatively higher distribution of the t,t-isomers of 9,11- or 10,12-octadecadienoic acid apparently results from the further stabilization of c9,t11- or t10,c12-geometric isomers, which is thermodynamically preferred, during an extended processing time. Additionally the t,t-isomer of 9,11- or 10,12-octadecadienoic acid that was predominantly formed during the isomerization of linoleic acid geometrical isomers (t9,t12-, c9,t12- and t9,c12-octadecadienoic acid) may influence the final ratio of the isomers or the final CLA content in the samples.

Linoleic acid geometrical isomers also influence the distribution of minor contributors (c,c-isomers of 9,11- and 10,12-, t9,c11- and c11,t12-octadecadienoic acids). 5,7; 8,10; and 11,13 isomers might be produced as minor products from c9, c12-octadecadienoic acid or from its isomeric forms during processing.

The CLA can be administered in the form of veterinary compositions, such as solutions or emulsions. The exact amount to be administered, of course, depends upon the form of CLA employed, and the route of administration.

The preferred veterinary compositions of CLA contain the non-toxic sodium or potassium salt of CLA in combination with a suitable diluent. In addition to solutions or suspensions intended for oral administration, the composition can be a powder or a crushable tablet. When the compositions are solutions or suspensions intended for parenteral administration the preferred diluent will be Sterile Water for Injection U.S.P.

The amounts of CLA to be added to an animal's feed can range from about 0.01% to about 5.0% or more by weight of the animal's diet. The animal can be fed a diet containing the CLA from birth to harvesting or for some other period until at least some of beneficial effects of the CLA feeding on fat firmness are obtained.

The practice of the present invention is further illustrated by the following non-limiting examples:

EXAMPLE 1

Pigs weighing approximately 55 pounds were fed 0, 0.5 or 1.0 percent CLA by weight in their diet. After three and a half months, the pigs were slaughtered and the carcasses cooled prior to processing. When the carcasses were removed, a visible difference was seen between the firmness of the pork bellies and subcutaneous fat of the control and the pigs fed CLA. The pork bellies and subcutaneous fat from the CLA-fed animals were firmer and the bellies did not collapse or bend excessively when hung over a rod. The bellies were scored for appearance, consistency and fat firmness. Also, indices of meat quality (color, marbling, and water holding capacity) were determined. The results are shown in Tables 1 and 2.

TABLE 1

MEASURE OF MUSCLE QUALITY

| Treatment | Subjective Color[1] | Subjective Marbling[2] | Minolta $L*$[3] | Minolta $a+$[3] | Water Holding Capacity (mg)[4] |
|---|---|---|---|---|---|
| Control | 2.2 ± 0.70 | 1.9 ± 0.6 | 49 ± 3 | 9.9 ± 3 | 96.2 ± 52 |
| 0.5% CLA | 2.5 ± 0.53 | 2.1 ± 0.4 | 47 ± 4 | 9.3 ± 2 | 80 ± 63 |
| 1.0% CLA | 2.9 ± 0.4 | 2.2 ± 0.5 | 47 ± 4 | 10.1 ± 3 | 78.8 ± 41 |

Measurements taken on the longissimus dorsi muscle.
[1]Subjective Color: This is based on a score of 1–5 with 1 being undesirably pale, 3–4 preferable, and 5 too dark.
[2]Subjective Marbling: This is a score of 1–5 with 1 meaning very little to no marbling (intramuscular fat) and 5 having abundant marbling (equal to a prime quality grade). Today's trends would prefer the 2–3 range.
[3]Minolta Colorimeter readings: The L* value is a measure of lightness of muscle color, with the higher values being more light (closer to white). Pork should not be white in color; if it is this is an indication of the PSE condition (pale, soft, exudative). PSE pork is very undesirable due to its off taste, poor binding characteristic, and loss of water before and during cooking. The a+ value is redness of the meat with the higher value meaning it is more red.
[4]Water Holding Capacity: This is another measure of PSE. It is done by placing a piece of filter paper on the muscle after it has been exposed for 10 minutes (bloomed) and then weighing the amount of moisture picked up on the paper in mg. Higher values mean more water loss from the muscle surface.

TABLE 2

MEASURES OF FAT FIRMNESS

| Treatment | Subjective Firmness[1] | Belly Stiffness Span (inches)[2] |
| --- | --- | --- |
| Control | 2.5 ± .9 | 9.9 ± 6.5 |
| 0.5% CLA | 2.9 ± .6 | 13.3 ± 1.6 |
| 1.0% CLA | 3.1 ± .6 | 20.3 ± 2.1 |

[1]Subjective Firmness: This is a score of 1–5 with one being extremely soft to handle and 5 very firm to handle, preferred is around a 3–4.
[2]Belly stiffness was measured by hanging bellies lean side up over a rod and measuring the distance in inches between the belly ends. The greater the distance, the stiffer the belly.

As can be seen from the above, the pigs fed diets containing CLA had better muscle quality, and produced pork bellies which were significantly better for making bacon than the bellies of control pigs.

EXAMPLE 2

Pigs weighing approximately 55 pounds were fed 0, 4.8 or 9.5 percent CLA by weight in their diet. After three and a half months, the pigs were slaughtered and the carcasses cooled prior to processing. When carcasses were removed, a visible difference was seen between the muscle fibers in the meat of the control and the pigs fed CLA. The backfat and muscle of pigs fed CLA contained a lower percentage of unsaturated fatty acids, a higher percentage of saturated fatty acids, and a darker red color than meat from control animals.

The darker red color suggests a higher ratio of red fibers to white fibers in the meat. Meats having a higher red fiber concentration have a higher pH, and as a result, have a higher water binding capacity, retain more water and are juicier. This provides for a better product for postmortem processing.

The higher percentage of red fibers provides a darker meat color which shows a decreased likelihood of fading and advantageously improves the shelf color of cured meat. The increased pH also reduces lipid oxidation to improves shelf life.

The decrease in unsaturated fatty acids, especially polyunsaturated fatty acids, reduces susceptibility to oxidative rancidity by decreasing the number of reactive double bonds available for oxidation. As indicated in Table 3, the backfat of pigs fed CLA were higher in saturated fatty acids and lower in polyunsaturated and monounsaturated fatty acids than controls. This altered fatty acid profile correlated with a longer shelf life relative to meat from non-CLA-fed pigs.

TABLE 3

MEASURE OF FATTY ACID CONTENT

| Tissue | % CLA-60 g/kg diet) | Saturated Fatty Acid | Mono-unsaturated | Poly-unsaturated |
| --- | --- | --- | --- | --- |
| Liver | 0 | 40.7 | 13.8 | 36.5 |
|  | 4.8 | 40.8 | 13.0 | 36.0 |
|  | 9.5 | 41.4 | 11.9 | 35.6 |
| Muscle | 0 | 33.0 | 37.9 | 17.7 |
|  | 4.8 | 34.7 | 39.15 | 15.1 |
|  | 9.5 | 34.6 | 35.11 | 17.3 |
| Kidney | 0 | 32.9 | 12.2 | 40.1 |
|  | 4.8 | 33.3 | 12.3 | 38.7 |
|  | 9.5 | 33.4 | 11.5 | 38.0 |
| Backfat | 0 | 35.0 | 41.6 | 18.9 |
|  | 4.8 | 40.1 | 34.4 | 17.9 |
|  | 9.5 | 43.5 | 33.4 | 15.9 |

In addition to increasing the fat firmness, shelf life, and meat quality of pigs the method of the present invention is useful in increasing the fat firmness and shelf life of other meat animals, especially in mammals, such as a bovine animal, an equine animal, an ovine animal and a goat, or in avian species, especially poultry animals, such as chickens, geese, turkeys and ducks.

It also will be readily apparent to those skilled in the art that a number of modifications or changes may be made without departing from the spirit and scope of the present invention. Therefore, the invention is only to be limited by the claims.

We claim:

1. A method of increasing meat shelf life, the method comprising administering to a meat animal a conjugated linoleic acid (CLA) in an amount effective to increase the shelf life of the meat from the animal.

2. The method as claimed in claim 1 wherein the CLA is selected from the group consisting of a free conjugated linoleic acid, an ester of a conjugated linoleic acid, a non-toxic salt of a conjugated linoleic acid, an active isomer of a conjugated linoleic acid, an active metabolite of a conjugated linoleic acid, and a mixture thereof.

3. The method as claimed in claim 1 wherein the meat animal is a mammal.

4. The method as claimed in claim 3 wherein the animal is selected from the group consisting of a pig, a bovine, an equine, an ovine and a goat.

5. The method as claimed in claim 1 wherein the meat animal is an avian.

6. The method as claimed in claim 5 wherein the animal is selected from the group consisting of a chicken, a turkey, a goose and a duck.

7. The method as claimed in claim 1 wherein the CLA is administered orally.

8. The method as claimed in claim 1 wherein the CLA is administered parenterally.

9. A method for increasing pH of meat, the method comprising administering to a meat animal a conjugated linoleic acid (CLA) in an amount effective to increase the pH of the meat.

10. The method as claimed in claim 9 wherein the CLA is selected from the group consisting of a free conjugated linoleic acid, an ester of a conjugated linoleic acid, a non-toxic salt of a conjugated linoleic acid, an active isomer of a conjugated linoleic acid, an active metabolite of a conjugated linoleic acid, and a mixture thereof.

11. The method as claimed in claim 9 wherein the meat animal is a mammal.

12. The method as claimed in claim 11 wherein the animal is selected from the group consisting of a pig, a bovine, an equine, an ovine and a goat.

13. The method as claimed in claim 9 wherein the meat animal is an avian.

14. The method as claimed in claim 13 wherein the animal is selected from the group consisting of a chicken, a turkey, a goose and a duck.

15. A method for increasing red fiber in meat, the method comprising administering to a meat animal a conjugated linoleic acid (CLA) in an amount effective to increase the red fiber in the meat from the animal.

16. The method as claimed in claim 15 wherein the CLA is selected from the group consisting of a free conjugated linoleic acid, an ester of a conjugated linoleic acid, a non-toxic salt of a conjugated linoleic acid, an active isomer of a conjugated linoleic acid, an active metabolite of a conjugated linoleic acid, and a mixture thereof.

17. The method as claimed in claim 15 wherein the meat animal is a mammal.

18. The method as claimed in claim 17 wherein the animal is selected from the group consisting of a pig, a bovine, an equine, an ovine and a goat.

19. The method as claimed in claim 15 wherein the meat animal is an avian.

20. The method as claimed in claim 19 wherein the animal is selected from the group consisting of a chicken, a turkey, a goose and a duck.

21. A method for altering the ratio of saturated fatty acid to unsaturated fatty acid in meat, the method comprising administering to a meat animal a conjugated linoleic acid (CLA) in an amount effective to alter the ratio of saturated fatty acid to unsaturated fatty acid in the meat from the animal.

22. The method as claimed in claim 21 wherein the CLA is selected from the group consisting of a free conjugated linoleic acid, an ester of a conjugated linoleic acid, a non-toxic salt of a conjugated linoleic acid, an active isomer of a conjugated linoleic acid, an active metabolite of a conjugated linoleic acid, and a mixture thereof.

23. The method as claimed in claim 21 wherein the meat animal is a mammal.

24. The method as claimed in claim 23 wherein the animal is selected from the group consisting of a pig, a bovine, an equine, an ovine and a goat.

25. The method as claimed in claim 21 wherein the meat animal is an avian.

26. The method as claimed in claim 25 wherein the animal is selected from the group consisting of a chicken, a turkey, a goose and a duck.

27. A method of reducing oxidative rancidity in animal meat, the method comprising administering to a meat animal a conjugated linoleic acid (CLA) in an amount effective to reduce oxidative rancidity in the meat from the animal.

28. The method as claimed in claim 27 wherein the CLA is selected from the group consisting of a free conjugated linoleic acid, an ester of a conjugated linoleic acid, a non-toxic salt of a conjugated linoleic acid, an active isomer of a conjugated linoleic acid, an active metabolite of a conjugated linoleic acid, and a mixture thereof.

29. The method as claimed in claim 27 wherein the meat animal is a mammal.

30. The method as claimed in claim 29 wherein the animal is selected from the group consisting of a pig, a bovine, an equine, an ovine and a goat.

31. The method as claimed in claim 27 wherein the meat animal is an avian.

32. The method as claimed in claim 31 wherein the animal is selected from the group consisting of a chicken, a turkey, a goose and a duck.

* * * * *

UNITED STATES PATENT AND TRADEMARK OFFICE
CERTIFICATE OF CORRECTION

PATENT NO. : 6,060,087
DATED : May 9, 2000
INVENTOR(S) : Mark E. Cook et al.

It is certified that error appears in the above-indentified patent and that said Letters Patent is hereby corrected as shown below:

Col. 1, line 5, delete "Not applicable." and insert therefor:

--This invention was made with United States government support awarded by the following agencies:

USDA 96-35206-3524

The United States Government has certain rights in this invention.--

Signed and Sealed this

Twenty-seventh Day of March, 2001

Attest:

NICHOLAS P. GODICI

Attesting Officer

Acting Director of the United States Patent and Trademark Office